Patented July 24, 1934

1,967,830

UNITED STATES PATENT OFFICE 1,967,830

MOLD LUBRICANT FOR CLAY PRODUCTS

Paul C. Lemmerman, East Cleveland, Ohio, assignor to The Grasselli Chemical Company, Cleveland, Ohio, a corporation of Delaware No Drawing. Application April 26, 1933, Serial No. 668,140

7 Claims. (Cl. 25—156)

The present invention relates to mold lubricants as used in coating molds for bricks or other products made of clay to prevent adhesion of the wet clay compositions to the molds and comprises particularly the use of aqueous solutions of alkali metal salts of weak, polybasic acids of relatively high molecular weight as the lubricants.

It is common in the making of water-struck bricks and other products molded from plastic clays to wet or dip the wooden or other molds in water or a soap solution so that the molded product can be removed from the mold without distortion.

The efficiency of water or a soap solution as a lubricant is not very great and in making water-struck bricks particularly, quite a number of the bricks are deformed on removal from wet molds.

I have found that in wetting the molds with dilute solutions of various salts a much easier removal of the bricks or molded products take place. By this wetting, the solutions form a "parting film" which prevents the adhesion of the clays to the surfaces of the mold. Some of the salts which I have found to be efficient mold lubricants are alkali metal salts of a non-acidic reaction, such as for instance sodium citrate, sodium tetraborate (borax), sodium tartrate, trisodium phosphate, disodium phosphate, sodium oxalate, etc. and the corresponding potassium salts. These salts have various chemical properties in common: they are easily soluble in water with a neutral or alkaline, that is to say, non-acid reaction. They are all derived from relatively weak, poly-valent acids, which in aqueous solution are capable of forming a poly-valent negative ion of an ionic weight greater than about 80.

The efficiency of these various salts seems to be directly dependent on the weight of this negative ion. The greater the weight of the ion the greater is the efficiency of the material as a mold lubricant.

These characteristics are tabulated below. I included in this table various other materials which do not conform to the above specifications for my efficient mold lubricants and which, as a matter of fact, are much poorer in lubricating properties than my preferred materials.

| Material | Valence of negative ion | Weight of negative ion | Degree of efficiency |
|---|---|---|---|
| Sodium citrate ($2Na_3C_6H_5O_7.-11H_2O$). | 3 | 189 | Very excellent. |
| Sodium tetraborate ($Na_2B_4O_7.-10H_2O$). | 2 | 155 | Excellent. |
| Sodium tartrate ($Na_2C_4H_4O_6.-2H_2O$). | 2 | 148 | Do. |
| Trisodium phosphate ($Na_3PO_4.-12H_2O$). | 3 | 95 | Do. |
| Disodium phosphate ($Na_2HPO_4.-12H_2O$). | 3 | 95 | Do. |
| Sodium oxalate ($Na_2C_2O_4$) | 2 | 88 | Do. |

Less efficient mold lubricants

| | | | |
|---|---|---|---|
| Sodium silicate | 2 | 76 | Fair. |
| Sodium carbonate ($Na_2CO_3$) | 2 | 60 | Poor. |
| Sodium acetate ($NaC_2H_3O_2$) | 1 | 59 | Very poor. |

Soluble salts of other poly-valent, weak organic and inorganic acids could be used as lubricants in the present invention, as for instance phthalic acid, malonic acid, succinic acid, maleic acid, but these salts would, due to their relatively high price, be less desirable than the cheap phosphates and borates.

We can assume for the present purpose that di- and tri-sodium phosphate are the alkali metal salts of an acid of the formula $NaH_2PO_4$; as a matter of fact sodium-di-acid phosphate is relatively weakly acid, its aqueous solutions reacting acid against the common indicators. It differs, however, entirely in strength from strong acids, such as sulfuric, hydrochloric, nitric, etc. Monosodium phosphate is neutralized to the disodium phosphate by sodium carbonate. Disodium phosphate on the other hand is slightly alkaline to methyl orange indicator.

The solutions which I use to wet or coat the molds can be rather dilute; concentrations of less than 1% show already a distinct beneficial lubricating effect, and the full lubricating effect is usually obtained in dilute solutions of from 1 to 2% concentration. No further improvement in lubrication is shown by more concentrated solutions and their use would merely constitute a waste of material.

The use of my novel lubricants for the coating of molds for clay products has a number of decided advantages over other previously used lubricants.

It increases the possible output of a given equipment both due to speedier removal of the green bricks from the molds and a decrease in the number of bricks which are deformed on removal. It was, for instance, shown that on a large brick-forming machine the number of bricks turned out in a day could be increased from 30,000 to 32,000 pieces by replacing previously used lubricants by a dilute disodium phosphate solution.

My novel lubricants are only very slightly alkaline and can be handled without detriment, whereas sodium silicate solutions are very corrosive to the worker's skin causing many bad sores and cracks which are slow in healing.

It was also found, when other lubricants were used in the manufacture of water-struck bricks, that the common addition of barium carbonate to the clay for the prevention of scum, even in amounts as low as ¾ lb. per 1,000 bricks caused the brick to stick in the mold.

With dilute (for instance 1.5%) solutions of either borax or disodium phosphate used as the lubricant it was found possible to add barium carbonate to the clay in amounts as high as seven pounds per 1,000 bricks before the brick began to stick in the mold. It appears, furthermore, that strongly alkaline lubricants, such as sodium silicate solutions which remain on the face of the bricks absorb acidic, scum forming gases in the drier and thereby discolor the finished bricks, whereas with my weakly alkaline or neutral solutions such discoloration is reduced to a minimum.

It was also found that bricks formed in molds lubricated with my new lubricants had a smoother and more even surface than bricks struck with water, soap or other lubricants.

Due to their high efficiency as mold lubricants, low price and low alkalinity I found that solutions of borax and disodium phosphate are the most practical lubricants to be used.

I claim:

1. In a process of molding clay products the step of wetting, or coating the molds with an aqueous solution of a non-acidic salt of a poly-valent, weak acid, the negative ion of which has an ionic weight greater than about 80.

2. In a process of molding clay products the step of wetting, or coating the molds with an aqueous solution of a non-acidic alkali metal salt of a poly-valent, weak acid, the negative ion of which has an ionic weight greater than about 80.

3. In a process of molding clay products the step of wetting, or coating the molds with an aqueous solution of a non-acidic sodium salt of a poly-valent, weak acid, the negative ion of which has an ionic weight greater than about 80.

4. In a process of molding clay products the step of wetting, or coating the molds with an aqueous solution of a non-acidic alkali metal salt of an acid selected from the group of acids consisting of citric, tartaric, oxalic, phosphoric and tetraboric acids.

5. In a process of molding clay products the step of wetting or coating the molds with an aqueous, dilute solution of borax.

6. In a process of molding clay products the step of wetting or coating the molds with an aqueous, dilute solution of disodium phosphate.

7. In a process of molding clay products the step of wetting or coating the molds with an aqueous, dilute solution of trisodium phosphate.

PAUL C. LEMMERMAN.